United States Patent [19]
Atake et al.

[11] Patent Number: 5,843,555
[45] Date of Patent: Dec. 1, 1998

[54] PATTERN-BEARING SHEET FOR USE IN SIMULTANEOUS INJECTION-MOLDING AND PATTERN-FORMING METHOD

[75] Inventors: Hiroyuki Atake; Kazuhisa Kobayashi, both of Tokyo, Japan

[73] Assignee: Dai Nippon Printing Co., Ltd., Japan

[21] Appl. No.: 361,307

[22] Filed: Dec. 20, 1994

[51] Int. Cl.$^6$ ............................... B29C 45/14; B32B 5/00
[52] U.S. Cl. ........................... 428/98; 264/40.1; 264/511; 264/513; 428/159; 428/160; 428/172; 428/212
[58] Field of Search ............................... 428/98, 159, 160, 428/172, 173, 212; 264/40.1, 40.2, 40.7, 511, 513

[56] References Cited

U.S. PATENT DOCUMENTS 4,639,341  1/1987  Hanamoto et al. ..................... 264/40.1

FOREIGN PATENT DOCUMENTS 5220781  8/1993  Japan .

Primary Examiner—Nasser Ahmad
Attorney, Agent, or Firm—Parkhurst & Wendel, L.L.P

[57] ABSTRACT

A pattern-bearing sheet for a simultaneous injection-molding and pattern-forming method, has a sufficient malleability in the following conditions. When the sheet is cut to a 10-mm width and subjected to a tensile load and thus elongated at a rate of 30%/second in an environment at 50° C., the sheet should exhibit a stress value of 0.6 kg or higher at the yield point and after passing through the yield point in the case where the sheet is formed from a material having a yield point, and the sheet should exhibit a stress value of 0.6 kg or higher at an elongation of 10% and higher in the case where the sheet is formed from a material not having a yield point. Desirably, the value when the sheet cut to 10-mm width is elongated at a rate of 7%/second to an elongation of 200% (200% modulus value) at a temperature of 100° C. to 120° C. should be 0.3 kg or lower.

8 Claims, 3 Drawing Sheets

PATTERN-BEARING SHEET FOR USE IN SIMULTANEOUS INJECTION-MOLDING AND PATTERN-FORMING METHOD

BACKGROUND OF THE INVENTION

This invention relates generally to injection molding and to transfer of graphical or pictorial patterns from a substrate sheet onto articles or to laminate a pattern bearing film onto articles. More particularly the invention relates to a sheet for forming a pattern on an article simultaneously undergoing injection molding.

A simultaneous injection-molding and pattern-forming method is a method in which, during injection molding of an article, a pattern-bearing sheet, which has been inserted between female and male molds, is caused to adhere unitarily to molten resin injected into the cavity between the two molds to form the article to thereby transfer the pattern on the sheet onto the surface of the article or to apply a substrate sheet together with the pattern. An example of such method is disclosed in U.S. Pat. No. 4,639,341 to Hanamoto et al. Depending on the nature of the pattern-bearing sheet used, this method is called the laminate printing method or the transfer printing method.

More specifically, in the laminate printing method, the entire layer of a pattern-bearing sheet comprising a substrate sheet and a pattern layer is caused to adhere integrally to the surface of the article being molded thereby to become a decorative layer. This pattern-bearing sheet is called a laminate sheet. In the transfer printing method, of the pattern-bearing sheet caused to adhere unitarily to the surface of the molded article, only the substrate film is peeled off and the transferred layer such as a pattern layer is left as a decorative layer on the side of molded article.

The simultaneous injection-molding and pattern-transfer forming will be described in detail hereinafter with respect to a specific example. In the practice of this method, certain important requirements must be satisfied in order to obtain molded products of good quality. One requirement is that the pattern-bearing sheet have good malleability or formability. That is, the pattern-bearing sheet, while being stretched to a certain extent in the simultaneous injection-molding and pattern-forming process, must not undergo damage such as excessive deformation, fluidization, and/or tearing. Various measures have been resorted to in the prior art in order to meet this requirement and others as will be described more fully hereinafter. However, these measures cannot be said to be completely satisfactory.

SUMMARY OF THE INVENTION

It is an object of this invention to provide a pattern-bearing sheet which is suitable for use in a known simultaneous injection-molding and pattern-forming method carried out with the use of any mold assembly and under ordinary conditions, and which has sufficient formability for amply following along and conforming to the contour of the mold inner surface during preforming and during injection molding without excessive deformation, fluidization, tearing, and other damage.

As a result of research conducted, the inventors have made certain findings on which this invention is based, and which have enabled achievement of the objects of the invention.

According to this invention, in one aspect thereof, there is provided a pattern-bearing sheet for molding to be used in a simultaneous injection-molding and pattern-forming method, the sheet being formed from a first or a second material respectively having or not having a yield point, the stress value at the yield point and after passing through the yield point in the case of the first material and that at or above an elongation of 10% in the case of the second material being 0.6 kg or higher when the sheet, which has been cut to 10-mm width, is subjected to a tensile load and thus elongated at a rate of 30%/second in an environment at 50° C.

According to this invention, in another aspect thereof, there is provided a pattern-bearing sheet as set forth above in which the stress value (herein referred to as the 200% modulus value) is 0.3 kg or lower at a temperature of 100° C. to 120° C. when the sheet cut to 10-mm width is subjected to a tensile load and thus elongated at a rate of 7%/second to an elongation of 200%.

The nature, utility, and further features of this invention will be more fully understood from the following detailed description when read in conjunction with the accompanying drawings.

DETAILED DESCRIPTION

Figure 4:
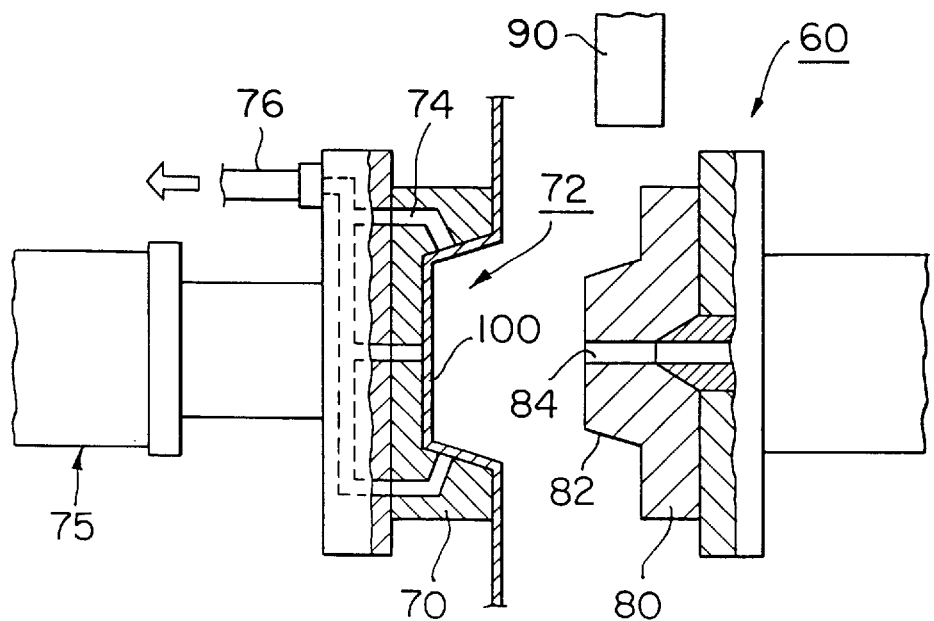
FIG. 4 is a side view, partly in section, showing female and male molds and a pattern-bearing sheet in place in an initial step of a simultaneous injection-molding and pattern-forming method.
Figure 5:
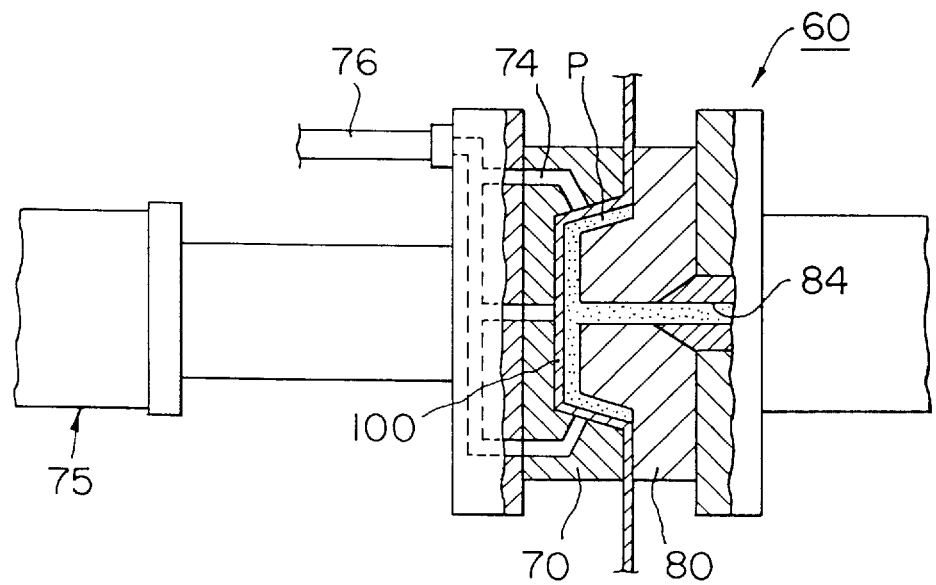
FIG. 5 is a side view, similar to FIG. 4, showing the method in a final phase thereof.

As conducive to a full understanding of this invention, the general nature, attendant problems, and limitations of the simultaneous injection-molding and pattern-forming method will first be considered in detail with respect to one example of this method in the case where a pattern-bearing sheet is used, reference being made to FIGS. 4 and 5.

An essential part 60 of the apparatus for practicing the simultaneous injection-molding and pattern-forming method is provided with a female mold 70 and a male mold 80 in mutually opposed and coaxially aligned positions with horizontal operational axes. On its side confronting the male mold 80, the female mold 70 has a cavity 72 of an inner wall shape corresponding to the outer shape of the article to be injection molded. The female mold 70 is provided therearound with air suction holes 74 opening at their inner ends into the interior of the cavity 72 and connected commonly at their other ends to an outlet pipe 76. Furthermore, the female mold 70 is actuated in a horizontal direction to advance toward or retract away from the male mold 80 by an advancing/retracting device 75 comprising a cylinder-plunger mechanism or the like. The male mold 80 has a core part 82 for insertion into the cavity 72 of the female mold 70 and is provided centrally therethrough with a gate 84 for injection of molten resin. Depending on the necessity, a heating plate 90 is installed in a manner to advance into and retract from between the female and male molds 70 and 80.

By using the apparatus 60 as described above, injection molding and pattern forming are carried out simultaneously in the following manner. First, a pattern-bearing sheet 100 is positioned confrontally on the side of the female mold 70. Depending on the necessity, this pattern-bearing sheet 100 is heated and softened at a temperature on the order of 100° C. to 120° C. by means of the heating plate 90. Then the sheet 100 is clamped between the female mold 70 and the heating plate 90 thereby to close the opening plane of the cavity 72. Evacuation of the cavity 72 is then carried out through the air suction holes 74 and the outlet pipe 76. At the same time, pressurized air is supplied through air passages (not shown) provided in the heating plate 90. The two molds are ordinarily heated at a temperature on the order of 30° to 50° C.

The sheet 100 is thereby in tight contact in a stretched state along the inner surface of the cavity 72 as shown in FIG. 4. This process step is generally referred to as preforming. Ordinarily the sheet is softened at a temperature on the order 100° to 120° C. and is elongated to a degree on the order of up to 200% as a maximum.

The heating plate 90 is then withdrawn, whereupon the female mold 70 is advanced into mating engagement with the male mold 80 as shown in FIG. 5 thereby to achieve mold closure. Thereafter molten resin is injected through the gate 84 provided in the male mold 80 and into the cavity space formed between the female and male molds 70 and 80 to fill the space. Thus injection molding is carried out.

As a result, the sheet 100 within the female mold 70 becomes integrally bonded to the injected resin (becoming the molded product P after cooling and setting). After completion of injection molding, the mold assembly is opened, and the molded article with the pattern-bearing sheet bonded onto the outer surface thereof is extracted.

In a subsequent process step, in the case where the pattern-bearing film is a transfer sheet, only the substrate film of the sheet 100 unitarily bonded to the surface of the molded article is peeled off, leaving the transferred layer such as a picture pattern layer to constitute the transferred layer on the molded article S. Thus the pattern forming is completed.

As will be seen from the above description, in this simultaneous injection-molding and pattern-forming method, certain important requirements must be satisfied in order to obtain molded products of good quality. One requirement is that, at the time of preforming or at the time of injection of the molten resin, the pattern-bearing sheet can be stretched in a hugging manner along the inner surface of the cavity 72 in close contact therewith (i.e., have formability). Another requirement is that, during this process, the pattern-bearing sheet is not stretched and thereby to undergo deformation by more than the minimum necessary quantity for following along the figuration of the mold, the excessive stretching being due to action by pressurized air, pressure of the molten resin, and/or tension stress shear stress. The importance of these requirements is the same also in the case where a laminate sheet is used for a pattern-bearing sheet. This is true particularly in the case of forming such as that with the use of a deep mold wherein the pattern-bearing sheet or the laminate sheet is subjected to deep drawing action.

Heretofore, in order to obtain a desirable formability, a material of good heat malleability such as polyvinyl chloride (PVC) and acrylonitrile butadiene styrene (ABS) has been used for the substrate films of the pattern-bearing sheet and the laminate sheet. However, particularly in cases such as that wherein deep drawing action is required, damage to the pattern-bearing sheet such as excessive deformation, fluidization, and tearing is caused in some instances by the pressurized air forming at the time of preforming and, further, by the heat and pressure of the injected molten resin at the time of injection molding. Furthermore, the film around the resin injection gate was sometimes stretched by the injected resin and caused deformation of the decorative layer, or the film sometimes cuts into the article being molded.

In order to prevent such damaging/deformation of the substrate sheet, the temperature of the mold has heretofore been lowered by cooling with water or other mediums from a normal temperature of from 40° to 60° C. to a temperature below 30° C. However, satisfactory results have not always been obtained by this measure. For example, rapid cooling is accompanied by residual internal stress within the molded article leading to defects such as warping after molding. Apart from this measure, various other attempts at improvement have been made for obtaining pattern-bearing sheets having good formability. One such measure has been the selection of various films to be the material also with respect to the substrate sheet. Another measure has been the suitable selection of the film thickness. Still another measure has been the adjustment of the quantity and kind of the plasticizer added. A further measure has been the adjustment of the degree of polymerization of the resin. To date, however, it has been difficult to say that pattern-bearing sheets fully satisfying the requirement of only necessary and sufficient formability are being obtained.

As stated hereinbefore, this invention aims at providing a pattern-bearing sheet which is suitable for use in a hitherto known simultaneous injection-molding and pattern-forming process carried out with the use of any mold assembly and under ordinary conditions even involving deep drawing action, and which has sufficient formability for amply following along the contour of the mold inner surface at the time of preforming and at the time of injection molding without excessive deformation, flowing, tearing, and other damage.

As a result of research by the inventors, including experimental studies, directed toward achieving the objects of this invention, the following findings were obtained, and the following relationships were discovered to be necessary for attaining these objects.

There must be a specific relationship between the stress and the strain in the pattern-bearing sheet in the case where, under the conditions of injection of the resin, the load is so applied that the elongation rate becomes constant. Furthermore, there must be a specific relationship (200% modulus) between the load and the temperature in the case where a specific elongation (200%) is caused in the pattern-bearing sheet preferably under the conditions wherein the sheet is subjected to preforming and moreover under the condition of constant elongation rate.

The term "stress" as used in this invention is not force per unit cross-sectional area but means the reactive force with respect to the tensile force applied to the entire cross section of a test sheet. Furthermore, the thickness of the test sheet is made the same as that used in actual molding. The reason for this is that the sheet used for simultaneous molding and pattern forming is not necessarily of a unit cross-sectional area, and the actual behavior of the sheet during molding is determined by the force acting on the entire thickness of the sheet of the actually used thickness. Furthermore, the reason for specifying a sheet width of 10 mm is that there is almost no correlation between the sheet width and the behavior of the sheet during actual molding, and that standardization is necessary for comparison with other sheets.

This invention is based on the above described findings. Upon repeated further research including experiments, it was confirmed that the following conditions are suitable for achieving the aforestated objects. Where the pattern-bearing sheet is formed from a material having a yield point and cut to a width of 10 mm and when such sheet is elongated by applying a tension at a rate of 30%/second in an environment at a temperature of 50° C., the stress value created in the sheet at the yield point and after passing through the yield point should be 0.6 kg or higher. Where the sheet is formed from a material not having a yield point and when the sheet of the same width as above is elongated by tension under the same conditions as above, the stress value created in the sheet at and after an elongation of 10% should be 0.6 kg or higher. In the case where the stress value is less than 0.6 kg, excessive deformation is caused in the sheet by the heat and pressure of the injected resin, giving rise to damage such as distortion of the pattern layer and tearing of the sheet.

Furthermore, the following was confirmed. That is, when the sheet cut to a width of 10 mm is elongated at a rate of 7%/second to a 200% elongation (200% modulus value), the stress value created in the sheet at 100° C. to 120° C. should preferably be 0.3 kg or less to obtain a particularly excellent formability at the time of preforming. In the case where 0.3 kg is exceeded, the sheet cannot withstand the maximum elongation of 200%, which is considered to be necessary in the case of ordinary simultaneous injection-molding and pattern-forming, and if the sheet is forcibly elongated to 200%, it will be severely deformed or damaged.

More specifically, it has been found that numerical ranges of the above mentioned stress value and the 200% modulus value have relationships with the occurrence or non-occurrence of excessive elongation and deformation of the pattern-bearing sheet at the time of injection molding, and with the degree of formability of the sheet at the time of preforming. Furthermore it was also confirmed that by using a simultaneous pattern-forming sheet having physical property values as stated above, a simultaneous injection-molding and pattern-transfer method can be practiced for carrying out excellent pattern transfer.

In this invention, the term "pattern-bearing sheet for molding" is used to designate the entire structure of a so-called pattern-bearing sheet comprising a substrate sheet and a layer such as a pattern-transfer layer or a printing-pattern layer. However, the thickness of a pattern-transfer layer or a printing-pattern layer is extremely thin relative to the thickness of the substrate sheet, and the physical property values of the substrate sheet with regard to both its thermodynamic and dynamic behavior determine the behavior of the entire sheet for simultaneous pattern forming. Accordingly, if only the sheet to constitute the substrate exhibits the behavior of the numerical ranges stated hereinabove, the necessary and ample formability of the sheet can be obtained. However, more preferably, a layer of the above stated numerical ranges is selected also for the pattern-transfer layer or the printing-pattern layer. Furthermore, as one mode of practice in the case of a laminate sheet, a substrate sheet is used as a single structure without the provision of a pattern layer or a transfer layer in some cases.

The objects of the present invention can be amply achieved if the stress value and the 200% modulus value satisfy specific required conditions as described above. Accordingly, in the practice of this invention, the material to constitute the pattern-bearing sheet (or the substrate sheet), simply stated, can be selected from a wide range of materials. Materials that are used for carrying out ordinary simultaneous injection molding and pattern forming, under the condition that they are to be used in a mode for satisfying the above stated conditions, are all applicable. For example, polyolefin resins such as polyethylene and polypropylene; vinyl resins such as polyvinyl chloride, polyvinylidene, polyvinyl alcohol, and ethylene-vinyl acetate copolymer; polyester resins such as polyethylene terephthalate; and acrylic resins such as polymethyl(metha)acrylate and polymethyl(metha)acrylate-buthyl(metha)acrylate. These materials can be appropriately used singly or in laminated state.

For imparting to these resin sheets the desired 200% modulus value and the stress value at the yield point and after passing through the yield point a known method of adjusting dynamic and thermal properties of the resin can be applied.

For instance, if polyvinyl chloride resin is taken as an example, these properties are its degree of polymerization, quantity (and kind) of plasticizer, and/or copolymerization (e.g., with vinyl acetate, olefin, etc.).

In general, the following variations occur.

In the case of: a large quantity of plasticizer; a low degree of polymerization; and a large copolymerization ratio of a monomer other than vinyl chloride, the above mentioned 200% modulus value decreases, and the stress value at the yield point and after passing through the yield point decreases.

In the case of: a small quantity of plasticizer; a high degree of polymerization; and a small copolymerization ratio of a monomer other than vinyl chloride, the above mentioned 200% modulus value increases, and the stress value at the yield point and after passing through the yield point increases.

However, the plasticizing property depends also on the kind of the plasticizer. In general dioctyl phthalate brings about a greater increase in the above values than tricresyl phosphate.

Furthermore, in the case of a polyethylene resin:

where the resin is a (low-crystallization degree) high-pressure polyethylene, the above mentioned 200% modulus value decreases, and the stress value at the yield point and after passing through the yield point decreases; and where the resin is a (high-crystallization degree) low-pressure polyethylene, the above mentioned 200% modulus value increases, and the stress value at the yield point and after passing through the yield point increases.

Furthermore, in the case of a thermoplastic linear polyester such as polyethylene terephthalate and polybutylene terephthalate:

where the elongation is small, the above mentioned 200% modulus value decreases, and the stress value at the yield point and after passing through the yield point decreases; and where the elongation is large, the above mentioned 200% modulus value increases, and the stress value at the yield point and after passing through the yield point increases.

In the case of poly(methyl)methacrylate; with increase of the degree of polymerization, the 200% modulus value and the stress value increases, and with decrease of the degree of polymerization, the 200% modulus value and the stress value decrease.

In the case of copolymer of (methyl)methacrylate and buthyl(metha)acrylate; with increase of copolymerization ratio of buthyl(metha)acrylate, both the 200% modulus value and the stress value decrease, and with decrease of copolymerization ratio of buthyl(metha)acrylate both the 200% modulus value and the stress value increase.

By utilizing the above described relationships, the above mentioned stress value and the modulus value are adjusted to be within specific ranges. Furthermore, in the case where the stress value and the modulus value are to be selected within their specific ranges also with respect to the resin binder to be used for the pattern transfer layer and the printing-pattern layer, the same procedure as that for the substrate layer is followed.

Also with regard to particulars such as the specifications of the mold and the kind of molten resin to be used in the injection molding, those ordinarily used can be applied, and there are no particular limitations.

EXAMPLES

In order to indicate more fully the nature of the present invention, the following examples are set forth, it being understood that they are not intended to limit the scope of the invention.

1. Three sheets a, b, and c having the properties indicated in FIGS. 2 and 3 were prepared.

Figure 2:
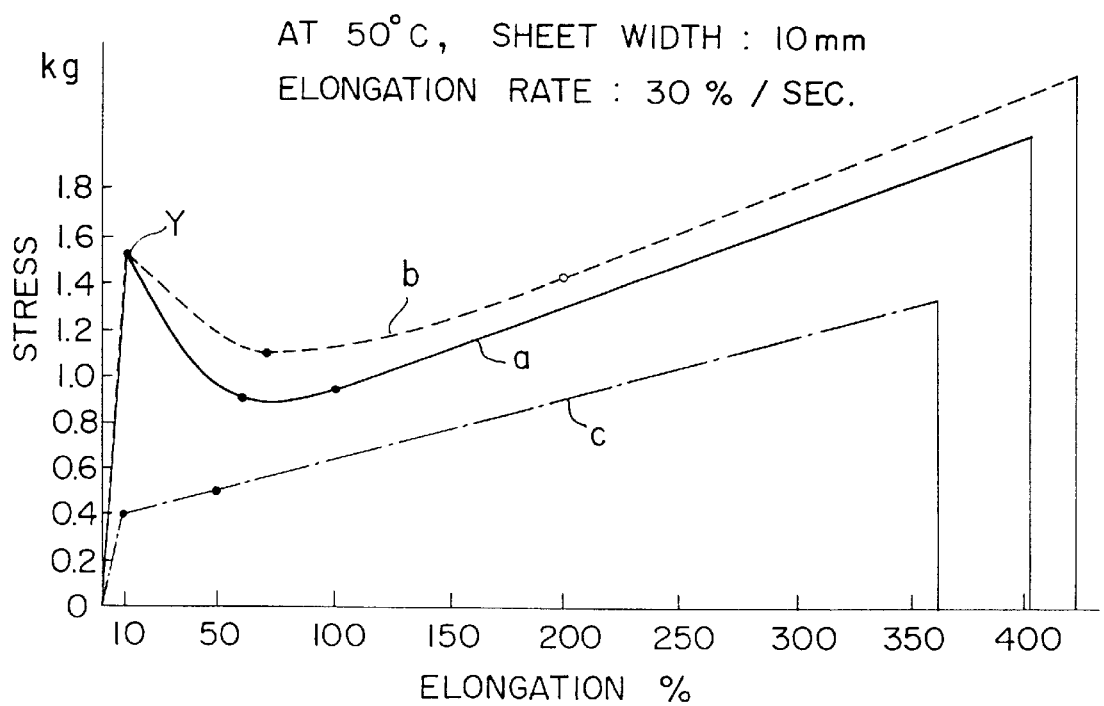
FIG. 2 is a stress-strain diagram of three sheets respectively of different properties under certain conditions.
Figure 3:
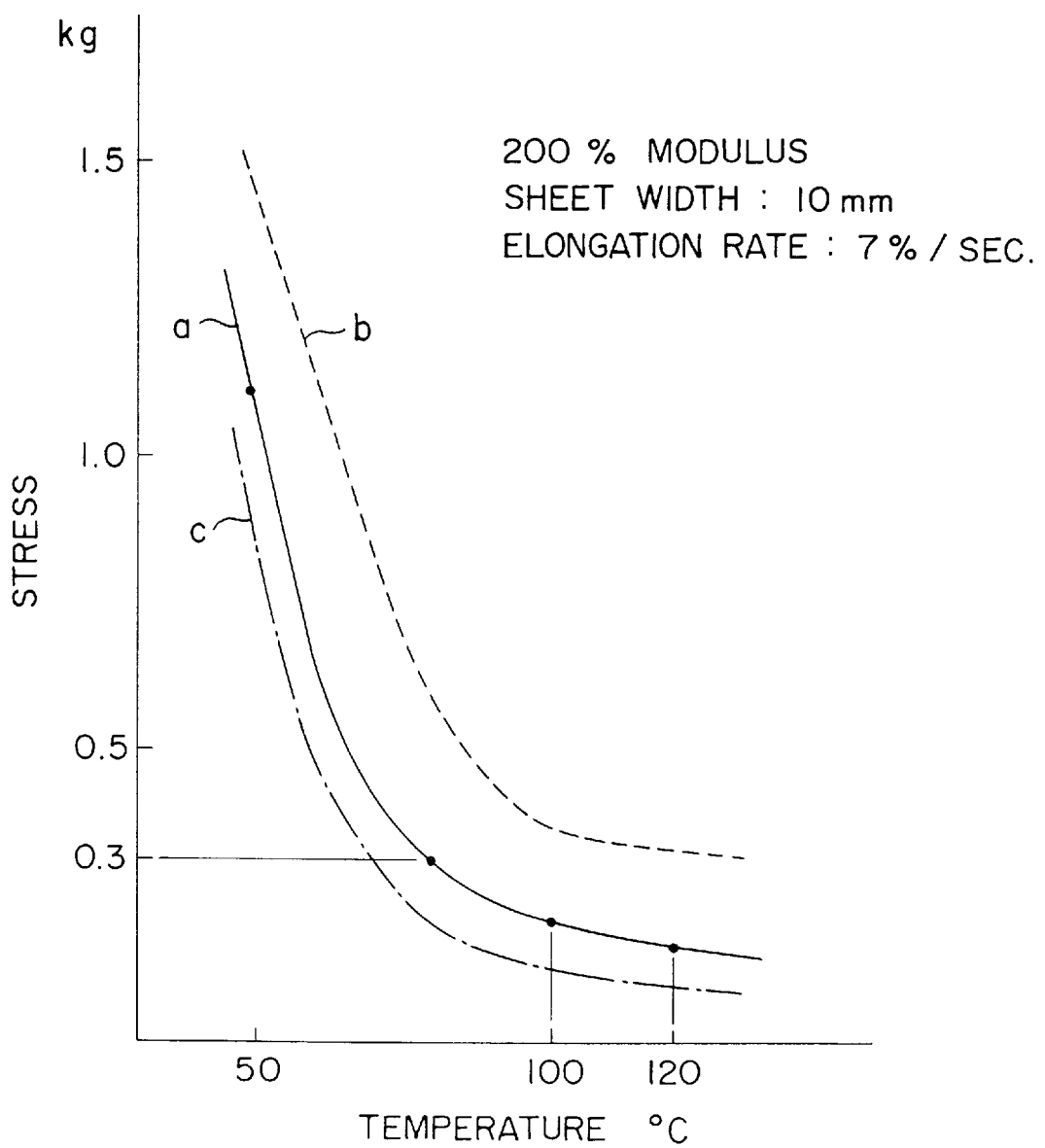
FIG. 3 is a graph indicating the relationships between temperature and stress of the same three sheets under certain conditions.

More specifically, FIG. 2 is a graph indicating stress-strain curves in the case where, with respect to the sheets each of 10-mm width, and under the same temperature environment (50° C.), the load was so applied that the elongation rate was constant (30%/second). FIG. 3 is a graph indicating the relationship of the load and the temperature (200% modulus) in the case where, under the condition of a constant elongation rate (7%/second) with respect to the same sheets each of 10-mm width, a specific elongation (200%) is imparted.

From FIGS. 2 and 3, it can be seen that: sheets a and b have yield points Y their stress values at the yield point Y and after passing through the yield point, are greater than 0.6 kg; and sheet c does not have a yield point, and its stress value at 10% elongation and at more than 10% elongation is less than 0.6 kg. Furthermore, the 200% modulus values at 100° C. and 120° C. were less than 0.3 kg in the cases of sheets a and c and greater than 0.3 kg in the case of sheet b. The material of the three sheets a, b, and c was polyvinyl chloride. Their degree of polymerization, plasticizers, and thicknesses were respectively as shown in Table 1.

TABLE 1

| Sheet | Degree of polymerization | Plasticizer | Thickness |
|---|---|---|---|
| a | 700 | 10p TCP (tricresyl phosphate) | 50 μm |
| b | 700 | 12p DOP (dioctyl phthalate) | 80 μm |
| c | 700 | 18p TCP (tricresyl phosphate) | 50 μm |

2. By carrying out gravure printing for the following constitution with respect to each of the above three sheets, pattern transfer films A, B, and C were obtained.

Printing ink
Releasing layer—a coating prepared by adding 3 parts by weight of silica to a double-fluid-setting type polyurethane resin whose setting agent is isocyanate was applied to a thickness of 3 μm (dried).

Transparent top coating layer—acrylic (Hakuri 46-7, Showa Ink Co., Japan)
Pattern layer—mixture of acryl and a vinyl chloride-vinyl acetate copolymer (BC-72, Showa Ink Co., Japan)
Adhesive layer—acryl (HS-32, Showa Ink, Co., Japan)

3. Each of the transfer films A, B, and C was cut to 400 mm×125 mm size.

Figure 1:
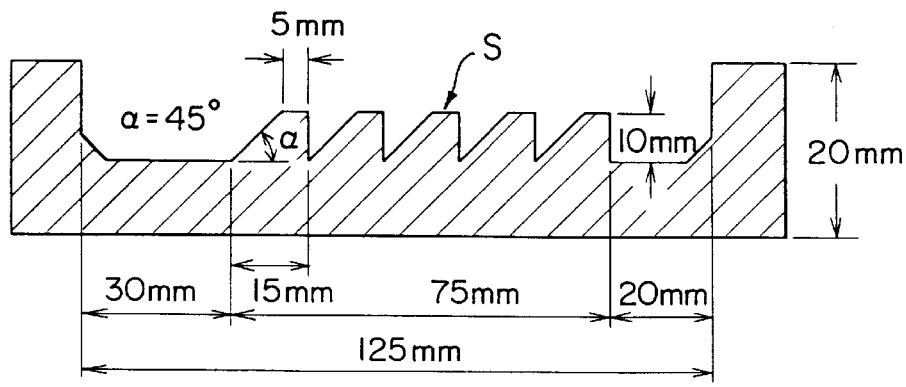
FIG. 1 is a sectional, partly enlarged, view showing a female mold used for injection molding in an example.

Preforming was carried out under the following conditions with respect to a mold (female mold) having a portion S of a saw-tooth figuration as shown in FIG. 1.

Forming conditions
The sheet elongation (value determined geometrically) in the case where a flat sheet is caused to adhere and conform closely and fully to the surface of the mold is 183%. This can be calculated from FIG. 1.
Heating: set temperature of heating plate was 180° C.
Non-contact between heating plate and film: distance therebetween was 15 mm.
Heating time duration: 10 seconds.
Film temperature: 110° C.
Vacuum-pressurized air forming:
after the above described heating, the mold (female mold) was evacuated, and air pressurization was carried out through the heating plate to thereby carry out preforming against the inner surface of the mold.

4. The preformabilities of the films were evaluated.

| Film | Preformability |
|---|---|
| A | good |
| B | poor |
| C | good |

At the figuration of the saw-tooth part, a portion of film B was separated from the mold. Thus this film B was judged to be deficient in its ability to conform to the figuration.

5. After the above described preforming, injection molding was carried out under the following conditions.

Injected resin: polystyrene (Esbrite M566, Sumitomo Kagaku Kogyo K.K., Japan)
Resin temperature: 210° C.
Mold temperature: 50° C.
Injection duration: 3 seconds
Cooling duration: 20 seconds
Gates: 6 positions After release from the mold, the molded article was separated from the film and the releasing layer, whereby a molded product having a pattern on its surface was obtained. The surface condition of each molded product thus obtained was visually inspected.

Molded product of transfer film A—good.
Molded product of transfer film B—the portion not preformed (that portion separated from the mold at the figuration of the saw-tooth part) was torn, and the film had penetrated into the molded product.
Molded product of transfer film C—the portion of the film around the gates had been elongated by the injection molding, and the film had penetrated into the molded product.

6. Analysis of results

From the results of the above described testing and inspection, the following conclusions can be made. Transfer film B is deficient in preformability. Transfer film C is easily elongated after preforming, whereby it is elongated on the mold at 50° C. by the flow of the injected resin.

7. Next, the same forming was carried out by using a mold from which the saw-tooth part S of the mold shown in FIG. 1 had been removed.

8. Evaluation of preformabilities

| Film | Preformability |
|------|----------------|
| A    | good           |
| B    | good           |
| C    | good           |

9. Visual inspection of surface conditions of molded products.

Molded product of transfer film A—good

Molded product of transfer film B—good

Molded product of transfer film C—the portion of the film around the gates had been elongated excessively by the injection molding, and the film had penetrated into the molded product.

10. Analysis of results

From the results of the above described testing and inspection, the following conclusions can be made. In order to eliminate the wrinkling of the film at its portion in the vicinity of the gates after injection molding, it is necessary that the tensile strength of the sheet warmed to 50° C. by the mold at 50° C. be 0.6 kg or higher (10-mm width). For producing a molded product of a complex figuration, it is necessary that the 200% modulus of the film at 100° C. to 120° C. be 0.3 kg or lower (10 mm width).

From the results the following deductions can be made. The incapability of the transfer film B of conforming to the contour of a molded article of complex figuration is due to the fact that the 200% modulus of the film B is 0.3 kg or higher. The excessive elongation of the transfer film C caused by the injected molten resin is due to the fact that the stress value of the film C at the yield point and after passing through the yield point is 0.6 kg or less.

Thus it may be concluded that the present invention has the utility of providing a sheet of good formability for simultaneous injection molding and pattern formation.

What is claimed is:

1. A pattern-bearing sheet for molding to be used in a simultaneous injection-molding and pattern-forming method, comprising:

a substrate formed from a resin material having a yield point; and a pattern layer formed on said substrate;

wherein the stress value at the yield point and after passing through the yield point of said sheet is 0.6 kg or higher when said sheet, which has been cut to a 10-mm width, is subjected to a tensile load and thus elongated at a rate of 30%/second in an environment at 50° C.

2. The pattern-bearing sheet of claim 1, wherein a stress value in said sheets when the sheet cut to 10-mm width is subjected to a tensile load and thus elongated at a rate of 7%/second to an elongation of 200%, is 0.3 kg or lower at a temperature of 100° C. to 120° C.

3. A pattern-bearing sheet for molding to be used in a simultaneous injection-molding and pattern-forming method, comprising:

a substrate formed from a resin material not having a yield point; and a pattern layer formed on said substrate;

wherein the stress value at an elongation of 10% or higher of said sheet is 0.6 kg or higher when said sheet, which has been cut to a 10-mm width, is subjected to a tensile load and thus elongated at a rate of 30%/second in an environment at 50° C.

4. The pattern-bearing sheet of claim 3, wherein a stress value in said sheet, when the sheet cut to 10-mm width is subjected to a tensile load and thus elongated at a rate of 7%/second to an elongation of 200%, is 0.3 kg or lower at a temperature of 100° C. to 120° C.

5. The pattern-bearing sheet of claim 1, wherein said resin material is selected from the group consisting of polyolefin resins, vinyl resins, polyester resins and acrylic resins.

6. The pattern-bearing sheet of claim 1, wherein said pattern layer comprises at least one of a pattern transfer layer and a printing-pattern layer.

7. The pattern-bearing sheet of claim 3, wherein said resin material is selected from the group consisting of polyolefin resins, vinyl resins, polyester resins and acrylic resins.

8. The pattern-bearing sheet of claim 3, wherein said pattern layer comprises at least one of a pattern transfer layer and a printing-pattern layer.

* * * * *